United States Patent [19]

Berardinelli et al.

[11] 4,052,360

[45] Oct. 4, 1977

[54] REINFORCED FLAME RETARDANT POLYESTER COMPOSITION HAVING NON-DRIP CHARACTERISTICS

[75] Inventors: Frank M. Berardinelli, Millington, N.J.; Robert Edelman, Staten Island, N.Y.

[73] Assignee: Celanese Corporation, New York, N.Y.

[21] Appl. No.: 768,528

[22] Filed: Feb. 14, 1977

Related U.S. Application Data

[63] Continuation-in-part of Ser. No. 617,201, Sept. 24, 1975, abandoned.

[51] Int. Cl.$^2$ .......................... C08G 3/36; C08K 3/22
[52] U.S. Cl. .......................... 260/40 R; 260/857 PE; 260/860
[58] Field of Search ............... 260/40 R, 75 N, 75 T, 260/860, DIG. 24, 857 PA, 857 PE

[56] References Cited

U.S. PATENT DOCUMENTS 3,193,522   7/1965   Neumann et al. .................. 260/868

Primary Examiner—Sandra M. Person

[57] ABSTRACT

There is disclosed a process for preparing reinforced flame retardant copolyester molding compositions having non-drip characteristics. This process comprises intimately mixing a reinforcing agent, a Group Vb metal-containing compound, and the molten reaction product of a copolyester and a polycarbodiimide. The copolyester comprises the reaction product of (a) an alkane diol (as defined), (b) terephthalic acid, isophthalic acid or a dialkyl ester thereof, and (c) a halogenated derivative of the bishydroxyethylether of p,p'-isopropylidenediphenol. The polycarbodiimide must both (a) be derived from at least one aromatic diisocyanate which is either unsubstituted or contains up to one methyl substituent on each aromatic ring, and (b) contains at least three carbodiimide units per polycarbodiimide molecule.

The reinforced flame retardant copolyester molding resin composition prepared by this process may be readily molded to form three-dimensional shaped articles having satisfactory mechanical properties using conventional molding techniques.

21 Claims, No Drawings

REINFORCED FLAME RETARDANT POLYESTER COMPOSITION HAVING NON-DRIP CHARACTERISTICS

CROSS-REFERENCE TO RELATED APPLICATION

This is a continuation-in-part of U.S. Ser. No. 617,201, filed Sept. 24, 1975, and now abandoned.

BACKGROUND OF THE INVENTION

1. Field of the Invention

The present invention relates generally to reinforced flame retardant molding resin compositions. More particularly, this invention describes reinforced flame retardant polycarbodiimide modified copolyester molding resin compositions.

2. Summary of the Prior Art

Molding resin, such as glass reinforced polypropylene terephthalate and polybutylene terephthalate are flammable. The presence of many important reinforcing agents, such as glass, enhances rather than deters the burning rate of these molding resins. Since the reinforcing agents have a direct effect on the desirable physical-mechanical properties of these molding resins, several commercially advantageous applications may be precluded due to the flammability of these compositions.

U.S. Pat. No. 3,751,396, which is assigned to the assignee of the present invention, discloses that polypropylene terephthalate and polybutylene terephthalate molding resin compositions containing certain flame retardant additives disclosed in the prior art may have a tendency to drip flaming particles when subjected to a flame. An approach to overcome this deficiency has required the additional incorporation of a supplemental reinforcing agent, such as asbestos, having a length to diameter ratio greater than 50:1. However, the use of asbestos in particular is disadvantageous because of the health hazards which accompany the possible inhalation of asbestos fibers.

Furthermore, U.S. Pat. No. 3,794,617 discloses the preparation of flame retardant polyester fiber-forming compositions comprising the condensation product of a diol, a dicarboxylic acid, and a brominated diol of the formula

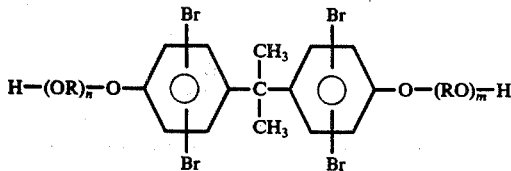

wherein R is a bivalent hydrocarbon radical containing from 2 to 6 carbon atoms and n and m are integers from 1 to 10. The brominated diol is said to comprise 1 to 20 weight percent of the copolyester composition. It is not disclosed, however, that this particular fiber-forming polyester composition may be useful in molding resin applications.

It is also known to react carbodiimides with polyesters (see, e.g., U.S. Pat. Nos. 3,193,522; 3,193,523; 3,193,524 and 3,835,098). For example, U.S. Pat. No. 3,193,522 provides a process for stabilizing polyester compounds against hydrolytic degradation by employing highly substituted polycarbodiimide additives having molecular weights of at least about 500 and having more than three carbodiimide groups in a polycarbodiimide molecule. U.S. Pat. Nos. 3,193,523 and 3,193,524 disclose the use of monocarbodiimides to stabilize polyesters. Furthermore, U.S. Pat. No. 3,835,098 discloses the reaction of intermediate molecular weight thermoplastic elastomeric copolyesters with minor amounts of polycarbodiimide in order to provide compositions which exhibit properties similar to those exhibited by copolyesters having a higher degree of polymerization.

Copending U.S. patent application Ser. No. 715,946, filed Aug. 19, 1976 by N. W. Thomas, F. M. Berardinelli, and R. Edelman (continuation-in-part of U.S. Ser. No. 588,982, filed Mar. 7, 1975 — now abandoned) which is assigned to the assignee of the present invention, generically discloses and claims a process for preparing certain polycarbodiimide modified thermoplastic polyesters. These modified thermoplastic polyesters have increased melt strength and are suitable for extrusion applications. This process comprises reacting the carboxyl end groups of a thermoplastic saturated polyester which is in the molten state with at least one polycarbodiimide which polycarbodiimide both (a) is derived from at least one aromatic diisocyanate which is either unsubstituted or contains up to one methyl substituent on each aromatic ring, and (b) contains at least three carbodiimide units per polycarbodiimide molecule.

The resulting polycarbodiimide modified thermoplastic polyesters have increased melt strength and intrinsic viscosity and a decreased number of carboxylic acid end groups. These improved melt strength polyesters also have improved die swell characteristics and are useful in extrusion applications such as blow molding.

Copending United States patent application Ser. No. 616,348, filed Sept. 24, 1975 (N. W. Thomas, F. M. Berardinelli and R. Edelman), is also assigned to the assignee of the present invention, discloses and claims an improved process for producing reinforced polycarbodiimide modified polyalkylene terephthalate molding resin compositions. This process comprises intimately mixing in the molten state a reinforcing agent with a polyalkylene terephthalate polymer such as polybutylene terephthalate or polypropylene terephthalate, the improvement in this process comprising modifying the polyalkylene terephthalate polymer by reacting the polyalkylene terephthalate polymer in the molten state with at least one polycarbodiimide, which polycarbodiimide both 1. is derived from at least one aromatic diisocyanate which is either unsubstituted or contains up to one methyl substituent on each aromatic ring, and
2. contains at least two carbodiimide units per polycarbodiimide molecule, whereby the resulting molding resin composition exhibits a substantially improved impact strength.

However, none of these patents or patent applications which disclose stabilizing or otherwise modifying polyesters by reacting them with carbodiimides disclose reinforced flame retardant compositions having non-drip characteristics.

OBJECTS AND SUMMARY OF THE INVENTION

Accordingly, a general object of the present invention is to avoid or substantially alleviate the above problems of the prior art.

A more specific object of the present invention is to provide a process for preparing reinforced flame retardant copolyester compositions having non-drip characteristics.

Another object of the present invention is to provide a process for preparing reinforced flame retardant copolyester compositions suitable for forming improved flame retardant three-dimensional shaped articles.

A further object of the present invention is to provide the reinforced flame retardant copolyester compositions prepared by these processes.

Still another object of the present invention is to provide reinforced flame retardant copolyester compositions which are non-dripping when subjected to flame even in the absence of asbestos.

Yet another object of the present invention is to provide an improved self-extinguishing copolyester molding resin composition which is capable of forming a three-dimensional shaped article which passes the UL-94 Flammability Test.

Other objects and advantages of the invention will become apparent from the following summary and description of the preferred embodiments of the present invention.

In one aspect, the present invention provides a process for preparing reinforced flame retardant copolyester molding resin compositions having non-drip characteristics. This process comprises intimately mixing (A) at least one reinforcing agent, (B) at least one Group Vb metal-containing compound, and (C) the molten reaction product of 1. a copolyester of
   a. at least one alkane diol having from two to six carbon atoms selected from the group consisting of ethylene glycol, 1,3-propane diol, 1,4-butane diol, 1,5-pentane diol, and 1,6-hexane diol,
   b. terephthalic acid, isophthalic acid, or a dialkyl ester thereof wherein the alkyl radical contains from 1 to 7 carbon atoms, and
   c. a halogenated derivative of the bishydroxyethylether of p,p'-isopropylidenediphenol, having the formula

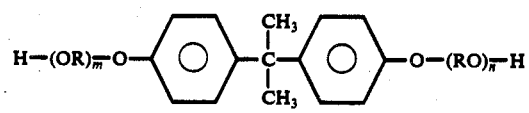

wherein the aromatic nuclei of p,p'-isopropylidenediphenol are substituted with from one to four halogen atoms, R is a bivalent hydrocarbon radical containing from 2 to 6 carbon atoms, m and n are integers from 1 to 10, and the halogenated derivative of the bishydroxyethylether of p,p'-isopropylidenediphenol comprises from about 8 to about 40% by weight of the copolyester composition, and 2. at least one polycarbodiimide, which polycarbodiimide both
   a. is derived from at least one aromatic diisocyanate which is either unsubstituted or contains up to one methyl substituent on each aromatic ring, and
   b. contains at least three carbodiimide units per polycarbodiimide molecule, whereby the resulting reinforced copolyester molding resin composition is flame retardant and exhibits non-drip characteristics.

In another aspect, the present invention provides the reinforced flame retardant polyester molding resin compositions produced by this process.

The essence of the present invention is the discovery that in a flame retardant molding resin composition comprising a reinforcing agent, a Group Vb metal-containing compound, and a halogenated copolyester, when the halogenated copolyester is reacted with a member of a limited group of polycarbodiimides, the resulting reinforced polycarbodiimide modified halogenated copolyester molding resin composition does not drip when subjected to flame even in the absence of asbestos.

DESCRIPTION OF THE PREFERRED EMBODIMENTS

As indicated hereinabove, the process of the present invention comprises reacting a copolyester, while in the molten state, with a polycarbodiimide, and intimately admixing therewith a reinforcing agent and a Group Vb metal-containing compound.

The reinforcing agents utilized in the present invention provide increased strength to the molded product. The reinforcing agents which may be used include, among others, glass fibers (chopped or continuous rovings), graphite fibers, acicular calcium metasilicate, and the like. Preferred fibers for use in the present process are those which are independently non-flammable. Glass fibers are particularly preferred. Particularly preferred glass reinforcing fibers are commercially available under the designation E glass (lime-aluminoborosilicate glass) and S glass (magnesium aluminosilicate glass). These are available in continuous length having a round cross section and a diameter of about 10 microns.

Mixtures of reinforcing agents may also be used.

Group Vb metal-containing compounds useful in the present invention include compounds containing phosphorus, arsenic, antimony or bismuth. Preferred Group Vb metal-containing compounds are the oxides of the Group Vb metal-containing compounds. The antimony oxides are particularly preferred Group Vb metal-containing compounds. Mixtures of two or more Group Vb metal-containing compounds may also be used.

The third essential ingredient used in the present invention is the reaction product of a copolyester and at least one polycarbodiimide. The copolyester is itself the result of the reaction between (a) at least one alkane diol having from 2 to 6 carbon atoms (described below), (b) terephthalic acid, isophthalic acid or a dialkyl ester thereof, and (c) a halogenated derivative of the bishydroxyethylether of p,p'-isopropylidenediphenol. As indicated the alkane diols useful in preparing the copolyester may contain from 2 to 6 carbon atoms. Such diols are ethylene glycol, 1,3-propane diol, 1,4-butane diol, 1,5-pentane diol, and 1,6-hexane diol. Preferred diols are 1,3-propane diol, and 1,4-butane diol.

The acid used in forming the copolyester may be terephthalic acid, isophthalic acid, or a dialkyl ester of terephthalic or isophthalic acid. The alkyl groups of the dialkyl ester may contain from one to seven carbon atoms and include methyl, ethyl, propyl, butyl, pentyl, hexyl, heptyl and the like. The dimethyl ester of terephthalic acid is preferred.

The alkane diols and terephthalic acid, isophthalic acid, or ester thereof are reacted with a halogenated derivative of the bishydroxyethylether of p,p'-isopropylidenediphenol, having the formula:

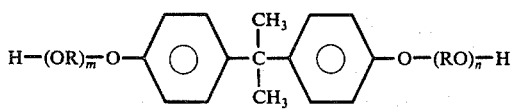

The aromatic nuclei of the p,p'-isopropylidenediphenol may be substituted with from one to four halogen atoms such as bromine and/or chlorine. Bromine substitution is preferred and the tetrabrominated derivative is particularly preferred. R is a bivalent hydrocarbon radical containing from two to six carbon atoms, with two carbon atoms being preferred. The m and n are integers from 1 to 10, preferably less than 3.

A preferred halogenated derivative of the bishydroxyethylether of p,p'-isopropylidenediphenol has the formula:

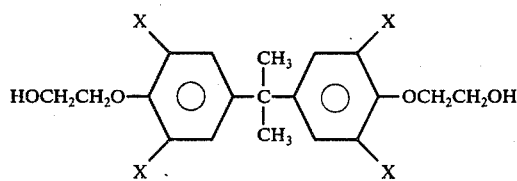

In this formula, the X's represent bromide and/or chlorine atoms.

A particularly preferred halogenated derivative of the bishydroxyethylether of p,p'-isopropylidenediphenol is 2,2-bis [3,5-dibromo-4-(2-hydroxyethoxy)-phenyl]propane which has the structural formula:

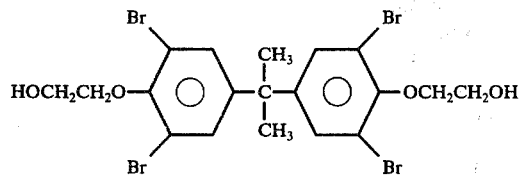

The halogenated derivative of the bishydroxyethylether of p,p'-isopropylidenediphenol comprises generally from about 8 to about 40, preferably from about 10 to about 30% by weight of the copolyester composition.

However, it should be noted that the amount of halogen incorporated into the copolyester should be between about 4 and about 12% by weight in order for the copolyester compositions to have flame retardant properties. Somewhat larger amounts of halogen are required when chlorine is used instead of bromine.

The halogenated derivative of the bishydroxyethylether of p,p'-isopropylidenediphenol and the copolyesters useful in the present invention may be prepared, e.g. by the procedures disclosed in U.S. Pat. No. 3,794,617 which is hereby incorporated by reference.

The polycarbodiimide which may be reacted with the above-described copolyester in the process of the present invention may be selected from a particularly defined group. Not all polycarbodiimides will enhance the non-drip character of reinforced copolyesters when reacted with the copolyesters. On the contrary, it has been found that only those polycarbodiimides which both (a) are derived from at least one aromatic diisocyanate which is either unsubstituted or contains up to one methyl substituent on each aromatic ring, and (b) contain at least three carbodiimide units per polycarbodiimide molecule will achieve the desired result.

Aromatic diisocyanates which are more heavily substituted result in polycarbodiimides which are not sufficiently reactive to provide the desired rate of reaction with the polyalkylene terephthalate. Polycarbodiimides having less than three carbodiimide units per polycarbodiimide molecule when contacted with the copolyesters may result in sagging of the copolyester when exposed to the flame.

The polycarbodiimide should be such that it is miscible with the copolyester which is in the molten state. The polycarbodiimides useful in the present invention may have number average molecular weights of generally from about 450 to about 10,000, typically from about 800 to about 8,000, and preferably from about 1,000 to about 6,500. Polycarbodiimides having molecular weights greater than about 10,000 may not dissolve in the copolyester melt and thus may not be useful in the present invention.

Specific examples of polycarbodiimides which are useful in the present invention include poly (tolyl carbodiimide), poly (4,4'-diphenylmethane carbodiimide), poly (3,3'-dimethyl-4,4'-biphenylene carbodiimide), poly (p-phenylene carbodiimide), poly (m-phenylene carbodiimide), poly (3,3'-dimethyl-4,4'-diphenylmethane carbodiimide) and mixtures thereof. Preferred polycarbodiimides include poly (tolyl carbodiimide), poly (4,4'-diphenylmethane carbodiimide) and mixtures thereof.

The polycarbodiimides may be formed in any manner known to those skilled in the art, for example, by heating the aromatic diisocyanate compounds defined above in the presence or absence of solvent. The formation of the polycarbodiimide is accomplished by the evolution of carbon dioxide gas.

Although the polycarbodiimides useful in the present invention may be prepared without the use of a catalyst, much higher temperatures (ca. 300° C.) are needed in the absence of a catalyst. For certain polycarbodiimides, the use of such high temperatures may result in the formation of large quantities of side products and colored products. Thus, the polycarbodiimides may be typically prepared by heating the isocyanates in the presence of a catalyst such as the phosphorus containing catalysts described in U.S. Pat. Nos. 2,853,473, 2,663,737, and 3,755,242, and also in Monagle, J. Org. Chem. 27, 3851 (1962). Phospholine oxides such as those described in Campbell et al, J. Amer. Chem. Soc. 84, 3673 (1962) are preferred catalysts. A particularly preferred catalyst is 1-ethyl-3-methyl-3-phospholine-1-oxide.

The polycarbodiimide formation reaction is preferably carried out under an atmosphere of argon or other dry inert gas so as to minimize the amount of water which may be in contact with the reactants since isocyanates tend to react rapidly with water at elevated temperatures.

Aromatic diisocyanates which may be used in preparing the desired polycarbodiimides include, for example, toluene diisocyanate 4,4'-diphenylmethane diisocyanate, 3,3'-dimethyl-4,4'-biphenylene diisocyanate, p-phenylene diisocyanate, m-phenylene diisocyanate, 3,3'-dimethyl-4,4'-diphenylmethane diisocyanate and mixtures thereof.

Preferred aromatic diisocyanates are toluene diisocyanate, 4,4'-diphenylmethane diisocyanate, and mixtures thereof.

The aromatic diisocyanates are preferably employed in an essentially pure state but may contain minor amounts (i.e., less than about 2% by weight) of other compounds such as ureas, amines, and traces of water and/or acid. The term "toluene diisocyanate" is meant to include 2,4-toluene diisocyanate, 2,6-toluene diisocyanate, or any combination of these isomers. Mixtures of the 2,4-and 2,6- isomers typically contain either 80 parts by weight 2,4-toluene diisocyanate and 20 parts by weight 2,6- toluene diisocyanate or 65 parts by weight 2,4-toluene diisocyanate and 35 parts by weight 2,6-toluene diisocyanate.

Aromatic monoisocyanates may also be used in conjunction with the aromatic diisocyanates in the preparation of the polycarbodiimides which are employed in the process of the present invention. These monoisocyanates help control the molecular weight and viscosity of the resulting polycarbodiimides. The amount of aromatic monoisocyanate used depends upon the particular diisocyanate employed, but generally from about 1.5 to about 50, typically from about 2 to about 45, and preferably from above 2.5 to about 40% by weight of the monoisocyanate, and correspondingly generally from about 50 to about 98.5, typically from about 55 to about 98, and preferably from about 60 to about 97.5% by weight of diisocyanate based upon the total weight of the isocyanate compounds may be employed.

Aromatic monoisocyanates which may be used in this way include, for example, p-chlorophenyl isocyanate, m-chlorophenyl isocyanate, phenyl isocyanate, p-methoxyphenyl isocyanate, m-methoxyphenyl isocyanate, p-tolyl isocyanate, m-tolyl isocyanate, o-tolyl isocyanate, p-nitrophenyl isocyanate, m-nitrophenyl isocyanate, 2,6-diethylphenyl isocyanate, and mixtures thereof.

Phenyl isocyanate, p-chlorophenyl isocyanate, m-chlorophenyl isocyanate and mixtures thereof are preferred monoisocyanates for use in the present invention.

Monoisocyanates along may not be used to prepare the polycarbodiimides since polymeric carbodiimides would not result from the heating of monoisocyanates alone.

Small amounts of specific high molecular weight phenoxy resins may also be used in the present invention as heat ageing agents. The phenoxy resins utilized herein are high molecular weight thermoplastic resins which are produced from 2,2'-bis(4-hydroxyphenyl) propane and epichlorohydrin according to the procedure as described in U.S. Pat. No. 3,356,646. These resins may be characterized by the repeating structure:

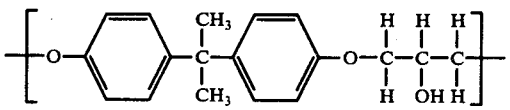

and have an average molecular weight range of from about 15,000 to about 75,000. The terminal structure is completed with hydrogen atoms or some suitable end capping groups.

Other additives, both polymeric and non-polymeric, such as lubricity agents, dyes, antioxidants, and inorganic fillers may be employed as long as these additives do not interfere with the reaction between the polycarbodiimide and the copolyester. Such additives may generally be present in amounts of up to about 3% by weight of the total composition.

The relative amounts of reinforcing agent, Group Vb metal-containing compound, copolyester and polycarbodiimide may vary widely, although there may be employed generally from about 15 to about 60, typically from about 20 to about 50, preferably from about 25 to about 45% by weight reinforcing agent, generally from about 0.7 to about 10, typically from about 2 to about 7, preferably from about 3 to about 6% by weight Group Vb metal-containing compound, generally from about 30 to about 80, typically from about 40 to about 75, and preferably from about 50 to about 70% by weight copolyester, and generally from about .25 to about 5, typically from about .35 to about 4, and preferably from about .45 to about 3% by weight polycarbodiimide based upon the total weight of the molding resin composition.

Amounts of reinforcing agent in excess of 60% result in processing difficulties whereas amounts of reinforcing agent less than 15% result in a lower flexural modulus and a lower heat deflection temperature.

Amounts of Group Vb metal-containing compound in excess of 10% result in reduced physical properties and appearance of the product whereas amounts of Group Vb metal-containing compound less than 0.7% result in products that may readily burn.

The use of amounts of polycarbodiimide in excess of 5% results in processing difficulties because of the increased melt strength of the composition. The use of polycarbodiimide in amounts less than about .25% results in a final composition that drips during the burn test.

The weight ratio of available halide in the copolyester to available Group Vb metal in the Group Vb metal-containing compound may be generally from about 0.3 to about 4, typically from about 0.4 to about 3, and preferably from about 0.46 to about 2. The amount of phenoxy resin incorporated may be generally from about 0.1 to about 10, typically from about 0.3 to about 8, and preferably from about 0.5 to about 3 weight percent of the total molding resin composition.

The reinforcing agents, Group Vb metal-containing compound, copolyester and polycarbodiimide may be blended in any convenient manner so long as the polycarbodiimide is in contact with the copolyester while it is in the molten state for a period of time sufficient for chemical reaction to occur. The ingredients may be dry blended or melt blended, blended in extruders, heated rolls, or other types of mixers. If desired, the reinforcing agent and Group Vb metal-containing compound may be blended with the copolyester (or with the reactants used in forming the copolyester) and polycarbodiimide during their chemical reaction so long as the chemical reaction between the copolyester and polycarbodiimide is not affected. The following illustrate several methods of blending the reinforcing agent, Group Vb metal-containing compound, copolyester and polycarbodiimide. A physical blend of copolyester, polycarbodiimide, Group Vb metal-containing compound, and reinforcing agent may be prepared and charged directly into a melt screw extruder such as a Werner-Pfleiderer ZSK twin screw extruder. This method may be disadvantageous, however, since the copolyester in its initial solid state may tend to cause breakdown of the reinforcing agent (e.g., the glass fibers). A preferred method of blending the copolyester, polycarbodiimide, Group Vb metal-containing compound and reinforcing agent is to charge the copolyester to the hopper of the extruder and add the polycarbodiimide, Group Vb metal-containing compound and reinforcing agent downstream in the extruder (e.g., in the vent port or other side feed port of the extruder.) The advantage of this method is that by the time the copolyester has reached the place in the extruder where the polycarbodiimide, Group Vb metal-containing compound, and reinforcing agent are to be added (e.g., the vent port), the copolyester has become molten and thus will result in minimal attrition of the reinforcing agent.

Another method of blending the copolyester, polycarbodiimide, Group Vb metal-containing compound, and reinforcing agent is to first react the copolyester and polycarbodiimide in a plastograph and then add the reinforcing agent and Group Vb metal-containing compound to the polycarbodiimide modified copolyester. However, the reaction of the copolyester with the polycarbodiimide results in an increase in the melt viscosity of the copolyester and this melt viscosity increase tends to result in attrition of the reinforcing agent when it is subsequently added.

The thermoplastic phenoxy resin may be added to the reinforced copolyester molding resin composition in a number of ways: (1) by incorporating the phenoxy resin onto the reinforcing agent prior to its intimate blending with the Group Vb metal-containing compound, copolyester and polycarbodiimide, (2) by simultaneously intimately mixing with the reinforcing agent, Group Vb metal-containing compound, copolyester and polycarbodiimide and then intimately blending with the reinforcing agent and Group Vb metal-containing compound. Other mixing techniques may also be used.

It should be noted that chemical reaction is actually taking place between the copolyester and the polycarbodiimide. The polycarbodiimides apparently tie together the various chains of copolyester molecules thus forming high molecular weight polycarbodiimide modified copolyesters of increased viscosity. This increased viscosity of the high molecular weight copolyester may tend to further retard dripping during burning.

The present process may be carried out at any temperature which is such that the copolyester will remain in the molten state for a period of time sufficient to enable reaction between the copolyester and the polycarbodiimide to take place. The reaction temperature should be high enough so tht the copolyester is in a molten state but not so high as to decompose the copolyester or polycarbodiimide. At atmospheric pressure, the reaction may be carried out at temperatures of generally from about 220° to about 300°, typically from about 225° to about 275°, and preferably from about 230° to about 260° C.

Although pressures may vary widely, and subatmospheric, atmospheric and superatmospheric pressures may be used, substantially atmospheric pressure is preferred.

The molten copolyester and the polycarbodiimide must be in contact for a sufficient time for chemical reaction to take place. The progress of the reaction may be monitored by observing the decrease in carboxylic acid end groups (CEG) of the copolyester with time. When no further decrease in CEG takes place, reaction has ceased. Of course, reaction time is a function of temperature, but in the present process, a reaction time of generally from about 1 to about 7, typically from about 1.25 to about 6.8, and preferably from about 1.5 to about 6.5 minutes (melt screw extruder) is usually sufficient to obtain the desired product. Because mixing does not take place to as great a degree in a plastograph as in a melt screw extruder, reaction times in the plastograph are generally somewhat longer.

The process of the present invention may, of course, be carried out in a batch, continuous or semi-continuous basis as desired.

The present invention is further illustrated by the following examples. All parts and percentages in the examples as well as in the specification and claims are by weight unless otherwise specified.

EXAMPLE I

This example illustrates the preparation and physical properties of various combinations of glass, $Sb_2O_3$, asbestos, phenoxy PKHH resin, a copolyester of 1,4-butane diol (approximately 33.5% by weight), dimethyl terephthalate (approximately 53.1% by weight), and 2,2-bis [3,5-dibromo-4-(2-hydroxyethoxy)phenyl] propane (approximately 13.4% by weight), and poly (4,4'-diphenylmethane carbodiimide).

Run 1 illustrates the properties associated with a composition comprising (a) a copolyester of 1,4-butane diol, dimethyl terephthalate, and 2,2-bis [3,5-dibromo-4-(2-hydroxyethoxy) phenyl]propane, (b) glass fibers, (c) antimony trioxide, and (d) poly (4,4'-diphenylmethane carbodiimide). Run 2 illustrates the properties associated with the composition of run 1, but using twice as much polycarbodiimide. Run 3 illustrates the properties associated with the composition of run 2, but using twice as much polycarbodiimide as well as 1% by weight phenoxy PKHH resin.

Run 4 is included for comparative purposes. This run illustrates the properties associated with the composition of run 3 but using Union Carbide Calidria asbestos fiber (Resin Grade 144) in place of the polycarbodiimide.

In each case the glass reinforcing agent is Owens Corning 419 3/16 inch chopped drawn glass. Also, in each case, all the ingredients of the composition are added through the hopper of a 28 millimeter Werner-Pfleiderer ZSK twin screw melt extruder having the following screw configuration:

| Pitch | 15, 45, 45, 30, 30, 30, 24, 24, 24, 24, 24, |
|---|---|
| Segment Length | 15, 45, 45, 60, 60, 48, 48, 48, 48, 48, 48, |
| Pitch | 30, 45, 45, 24, 24, 24, 24, 30, 30 |
| Segment Length | 30, 45, 45, 24, 24, 24, 24, 30, 30 |

Tensile and impact bars are molded in a 2 ½ ounce Stubbe screw injection machine under the molding conditions listed below in Table 1.

TABLE 1

| Run No. | 1 | 2 | 3 | 4 |
|---|---|---|---|---|
| Processing Temperature (° F.) | 490 | 490 | 490 | 490 |
| Mold Temperature (° F.) | 150 | 150 | 150 | 150 |
| Injection Pressure (psi) | 8000 | 8000 | 6000 | 6500 |
| Total Cycle Time (secs.) | 22 | 22 | 32 | 22 |
| Screw Speed (RPM) | 80 | 80 | 150 | 80 |

The molding composition is heated in the injection chamber of the molding machine. The material is then injected either by plunger or reciprocating screw under high pressure and in hot, fluid form into a relatively cold closed mold. After a short cooling cycle, the molded part is solidified to a degree sufficient to enable the part to be ejected from the mold without distortion.

The superiority of the resulting glass fiber reinforced molding resins may be confirmed by the standard UL-94 Flammability Test as previously mentioned. For instance, a bar of 4 inches by ½ inch by 1/16 inch may be formed by injection molding. The molded article is vertically mounted in a clamp, and a cotton pad is placed 12 inches below the bottom edge of the article. A ¾ inch blue flame from a natural gas Bunsen burner is applied to the lower edge of the article for 10 seconds; the burner is removed and flame-out time is determined. The flame immediately is reapplied for 10 seconds, and the flame is removed and flame-out time is again determined. In order for the article to pass this test it must: (a) not have any article burn for more than 10 seconds after each application of the flame, (b) not have a total flaming time exceeding 50 seconds for a set of five articles, and (c) have no molten drippings ignite the cotton pad.

For the purposes of the present description a given molded article is considered to be "non-dripping" when, in accordance with the above test, no burning droplets are absorbed when the flame is removed. For the purpose of the present description a given molded article is considered to be "self-extinguishing" when in accordance with the above test it does not burn longer than 10 seconds when the flame is removed.

The properties of the glass reinforced copolyester composition are summarized in Table 2 below:

of flame retardant properties is essential. For instance, the compositions of the present invention are particularly suited for use in high temperature electrical applications, distributor caps, terminal blocks, miscellaneous automotive under-the-hood applications, etc. Three-dimensional molded articles formed from the composition may be utilized in high temperature environments, e.g. at 140° to 200° C.

EXAMPLE II

This example illustrates the preparation of a polycarbodiimide which is used in the preparation of glass reinforced polycarbodiimide modified copolyester compositions of the present invention. The particular polycarbodiimide used is the reaction product of an aromatic diisocyanate and an aromatic monoisocyanate.

A 500 milliliter resin reaction flask is fitted with a gas inlet tube, magnetic stirrer bar, and a condenser (graham spiral loop) at the top of which the gas inlet tube leads to a bubbler for observing gas evolution. Toluene diisocyanate (105 grams), p-chlorophenyl isocyanate (62.1 grams) and bis ($\beta$-chloroethyl) vinyl phosphonate (13 grams) are added to the flask. The bis ($\beta$-chloroethyl) vinyl phosphonate is commercially available from the Stauffer Chemical Co. under the trade name Fyrol Bis Beta and is used as a catalyst in the present reaction.

Argon is passed copiously over the surface of the

TABLE 2

| Run No. | 1 | 2 | 3 | 4 |
|---|---|---|---|---|
| Tensile Strength psi | 12,800 | 14,100 | 13,800 | 16,700 |
| Tensile Mod. $10^6$ psi | 1.32 | 1.32 | 1.39 | 1.54 |
| Elongation % | 1.4 | 1.6 | 1.4 | 1.6 |
| Flex Strength psi | 18,800 | 22,100 | 19,300 | 23,700 |
| Flex Mod. $10^6$ psi | 1.32 | 1.29 | 1.34 | 1.51 |
| Izod ft.lb/in (notched) | 0.9 | 0.9 | 0.9 | 0.9 |
| (reverse notch) | 5.6 | 6.0 | 4.3 | 7.4 |
| (un-notched) | 6.4 | 8.6 | 5.9 | 10.4 |
| Gardner Impact* | | | | |
| gated end - in.lb. | 1.5 | 1.8 | 1.0 | 2.3 |
| non-gated end - in.lb. | 2.8 | 3.5 | 1.8 | 2.5 |
| Rockwell M | 74 | 84 | 86 | 83 |
| HDT, ° C, at 264 psi | 181 | 184 | 176 | 186 |
| Sp G 23/23 ° C | 1.656 | 1.656 | 1.640 | 1.673 |
| Flammability test UL-94 | V-O, non-dripping | V-O, non-dripping | V-O, non-dripping | V-O, non-dripping |
| *Run on T-bar ends | | | | |
| Product Color | tan | tan | light brown | light beige |
| Composition: | | | | |
| Copolyester | 65.5 | 65.0 | 63.3 | 62.6 |
| $Sb_2O_3$ | 3.77 | 3.77 | 3.64 | 3.6 |
| Phenoxy PKHH | — | — | 1.0 | 1.0 |
| Glass OC419 | 30.3 | 30.3 | 30.1 | 30.0 |
| Asbestos RG 144 | — | — | — | 2.6 |
| Polycarbodiimide | 0.48 | 0.97 | 1.92 | — |

The results summarized in Table 2 indicate that the addition of poly (4,4'-diphenylmethane carbodiimide) at a level of from about ½ to about 2% by weight based on the total weight of the composition results in reinforced, self-extinguishing compositions having non-drip characteristics even in the absence of asbestos. The molding compositions of the present invention may be readily molded to form three-dimensional shaped articles of satisfactory mechanical properties using conventional molding techniques commonly utilized for polypropylene terephthalate and polybutylene terephthalate. Either compression or injection molding procedures may be utilized. It is preferable that the molding technique utilized not result in any substantial fracture of the reinforcing agent.

The composition of the present invention when molded into a three-dimensional shaped article is particularly suited for use in applications where a high degree reactants. The flask containing the reactants is lowered into an oil bath at about 190° C. (internal reaction temperature of between about 170° and 180° C.). Argon is continuously passed over the reactants at a slow rate while the reaction is taking place.

Within minutes after immersion, bubbles of carbon dioxide may be observed by the clouding of a lime water solution. The reaction is continued for about 4 hours until a foamed material forms in the flask. Heating is continued for an additional period of time until the foam fills most of the flask. Argon is passed rapidly over the surfce during this period. Heating is then stopped and the flask is allowed to cool under an argon atmosphere. The reaction vessel containing the product is then weighed and a loss of about 20% is observed. The foam material is quite friable and is readily chipped out.

The remaining deep red material may also be chipped out or removed by softening with acetone. The product shows a small peak infrared (IR) for isocyanate (4.4 μ), a large peak for carbodiimide (4.7 μ), and a substantial peak which is probably polymerized carbodiimide (6.0 μ). The carbodiimide and polymerized carbodiimide combined material comprise about 90 to 95% of the product.

This product is further purified by heating under vacuum in an oil bath at 205° C. for 2 ½ hours. Loss in weight is variable with about 15% of the material being removed. The final product shows no isocyanate by IR. Purification also appears to remove virtually all of the catalyst since phosphorus levels are less than 0.1%.

The polycarbodiimide product is blended with the copolyester employed in Run 1 (Example I), glass fibers, and $Sb_2O_3$ in a manner similar to that of Run 1 of Example I and similar results are achieved.

COMPARATIVE EXAMPLE

This Comparative Example illustrates the effect of modifying glass reinforced copolyester compositions with (a) a monocarbodiimide and (b) a highly substituted polycarbodiimide.

The amounts, reaction conditions, apparatus and molding conditions are the same as in run 1 of Example I but instead of using poly (4,4'-diphenylmethane carbodiimide), there is employed (a) p-chlorophenyl carbodiimide (a monocarbodiimide) and (b) poly (2,6-diisopropyl-1,3-phenylene carbodiimide) (a highly substituted polycarbodiimide). In both cases, there is no substantial improvement in the non-drip characteristics of the glass-filled copolyester compositions over that of the glass-filled copolyester compositions containing no polycarbodiimide.

EXAMPLE III

Example I is repeated with the exception that an equimolar quantity of 1,3-propane diol is substituted for the 1,4-butane diol during the formation of the copolyester. Substantially similar results are achieved.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:
1. A process for preparing a reinforced flame retardant copolyester molding resin composition having non-drip characteristics comprising intimately mixing
    A. at least one reinforcing agent
    B. at least one Group Vb metal-containing compound, and
    C. the molten reaction product of
        1. a copolyester of
            a. at least one alkane diol having from two to six carbon atoms selected from the group consisting of ethylene glycol, 1,3-propane diol, 1,4-butane diol, 1,5-pentane diol, and 1,6-hexane diol,
            b. terephthalic acid, isophthalic acid, or a dialkyl ester thereof wherein the alkyl radical contains from 1 to 7 carbon atoms, and
            c. a halogenated derivative of the bishydroxyethylether of p,p'-isopropylidenediphenol, having the formula

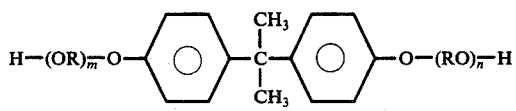

wherein the aromatic nuclei of the p,p'-isopropylidenediphenol are substituted with from one to four halogen atoms, R is a bivalent hydrocarbon radical containing from two to six carbon atoms, m and n are integers of from 1 to 10, and the halogenated derivative of the bishydroxyethylether of p,p'-isopropylidenediphenol comprises from about 8 to about 40% by weight of the copolyester composition, and
        2. at least one polycarbodiimide, which polycarbodiimide both
            a. is derived from at least one aromatic diisocyanate which is either unsubstituted or contains up to one methyl substituent on each aromatic ring, and
            b. contains at least three carbodiimide units per polycarbodiimide molecule, whereby said resulting reinforced copolyester molding resin composition is flame retardant and exhibits non-drip characteristics.

2. The process of claim 1 wherein said reaction between the polycarbodiimide and the copolyester takes place simultaneously with the mixing of the copolyester, reinforcing agent, and Group Vb metal-containing compound.

3. The process of claim 1 wherein the reaction between the copolyester and the polycarbodiimide takes place prior to admixture with the reinforcing agent and Group Vb metal-containing compound.

4. The process of claim 1 wherein there is employed from about .25 to about 5% by weight polycarbodiimide, from about 30 to about 80% by weight copolyester, from about 15 to about 60% by weight reinforcing agent, and from about 0.7 to about 10% by weight Group Vb metal-containing compound based upon the total weight of the reinforced resin composition.

5. The process of claim 2 wherein said reaction is carried out at a temperature of from about 220° to about 300° C and at substantially atmospheric pressure.

6. The process of claim 3 wherein said polycarbodiimide may be selected from the group consisting of poly (tolyl carbodiimide), poly (4,4'-diphenylmethane carbodiimide), poly (3,3'-dimethyl-4,4'-biphenylene carbodiimide), poly (p-phenylene carbodiimide), poly (m-phenylene carbodiimide), poly (3,3'-dimethyl-4,4'-diphenylmethane carbodiimide), and mixtures thereof.

7. The process of claim 4 wherein the reinforcing agent may be selected from the group consisting of glass fibers, graphite fibers, acicular calcium metasilicate, and mixtures thereof.

8. A process for preparing a reinforced flame retardant copolyester molding resin composition having non-drip characteristics comprising intimately mixing in the absence of asbestos
    A. from about 20 to about 50% by weight of at least one reinforcing agent
    B. from about 2 to about 7% by weight of at least one Group Vb metal-containing compound, and C. the molten reaction product of
1. from about 40 to about 75% by weight of a copolyester of
    a. at least one alkane diol having 3 or 4 carbon atoms selected from the group consisting of 1,3-propane diol and 1,4-butane diol,
    b. terephthalic acid, isophthalic acid, or a dialkyl ester thereof wherein the alkyl radical contains from 1 to 7 carbon atoms, and
    c. a halogenated derivative of the bishydroxyethylether of p,p'-isopropylidenediphenol, having the formula

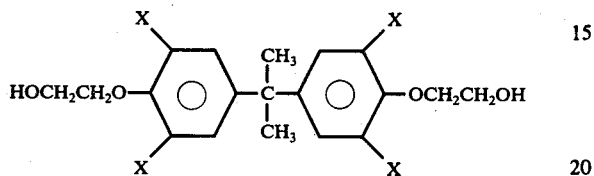

wherein the X's represent bromine and/or chlorine atoms and the halogenated derivative of the bishydroxyethylether of p,p'-isopropylidenediphenol comprises from about 10 to about 30% by weight of the copolyester composition, and
2. from about .35 to about 4% by weight of at least one polycarbodiimide, which polycarbodiimide both
    a. is derived from at least one aromatic diisocyanate which is either unsubstituted or contains up to one methyl substituent on each aromatic ring, and
    b. contains at least three carbodiimide units per polycarbodiimide molecule, whereby said resulting reinforced copolyester molding resin composition is flame retardant and exhibits non-drip characteristics.

9. The process of claim 8 wherein the reaction between the polycarbodiimide and the copolyester takes place simultaneously with the mixing of the copolyester, reinforcing agent, and Group Vb metal-containing compound.

10. The process of claim 8 wherein the reaction between the copolyester and the polycarbodiimide takes place prior to admixture with the reinforcing agent and Group Vb metal-containing compound.

11. The process of claim 8 wherein said polycarbodiimide may be selected from the group consisting of poly (tolyl carbodiimide), poly (4,4'-diphenylmethane carbodiimide), poly (3,3'-dimethyl-4,4'-biphenylene carbodiimide), poly (p-phenylene carbodiimide), poly (m-phenylene carbodiimide), poly (3,3'-dimethyl-4,4'-diphenylmethane carbodiimide) and mixtures thereof, said reinforcing agent may be selected from the group consisting of glass fibers, graphite fibers, acicular calcium metasilicate and mixtures thereof, and wherein said reaction is carried out at a temperature of from about 225° to about 275° C and at substantially atmospheric pressure.

12. A process for preparing a reinforced flame retardant copolyester molding resin composition having non-drip characteristics consisting essentially of intimately mixing in the absence of asbestos
A. from about 25 to about 45% by weight of at least one reinforcing agent selected from the group consisting essentially of glass fibers, graphite fibers, acicular calcium metasilicate and mixtures thereof,
B. from about 3 to about 6% by weight of at least one Group Vb metal-containing compound, and
C. the molten reaction product of
1. from about 50 to about 70% by weight of a copolyester of
    a. 1,4-butane diol,
    b. dimethyl terephthalate, and
    c. 2,2-bis[3,5-dibromo-4-(2-hydroxyethyl) phenyl] propane, and
2. from about 45 to about 3% by weight of a polycarbodiimide selected from the group consisting of poly (tolyl carbodiimide), poly (4,4'-diphenylmethane carbodiimide), poly (3,3'-dimethyl 4,4'-biphenylene carbodiimide), poly (p-phenylene carbodiimide), poly (m-phenylene carbodiimide), poly (3,3'-dimethyl-4,4'-diphenylmethane carbodiimide), and mixtures thereof said reaction being conducted at a temperature of from about 230° to about 260° C and at substantially atmospheric pressure whereby said resulting reinforced copolyester molding resin composition is flame retardant and exhibits non-drip characteristics.

13. A reinforced flame retardant copolyester molding resin compound having non-drip characteristics comprising an intimte blend of
A. at least one reinforcing agent
B. at least one Group Vb metal-containing compound, and
C. the reaction product of
1. a copolyester of
    a. at least one alkane diol having from two to six carbon atoms selected from the group consisting of ethylene glycol, 1,3-propane diol, 1,4-butane diol, 1,5-pentane diol, and 1,6-hexane diol,
    b. terephthalic acid, isophthalic acid, or a dialkyl ester thereof wherein the alkyl radical contains from 1 to 7 carbon atoms, and
    c. a halogenated derivative of the bishydroxyethylether of p,p'-isopropylidenediphenol, having the formula

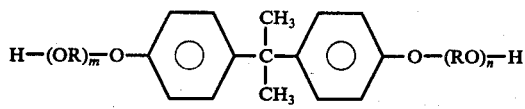

wherein the aromatic nuclei of the p,p'-isopropylidenediphenol are substituted with from one to four halogen atoms, R is a bivalent hydrocarbon radical containing from two to six carbon atoms, m and n are integers from 1 to 10, and the halogenated derivative of the bishydroxyethylether of p,p'-isopropylidenediphenol comprises from about 8 to about 40% by weight of the copolyester composition, and
2. at least one polycarbodiimide, which polycarbodiimide both
    a. is derived from at least one aromatic diisocyanate which is either unsubstituted or contains up to one methyl substituent on each aromatic ring, and
    b. contains at least three carbodiimide units per polycarbodiimide molecule, whereby said resulting reinforced copolyester molding resin composition is flame retardant and exhibits non-drip characteristics.

14. The reinforced flame retardant copolyester molding resin composition of claim 13 wherein there is employed from about 15 to about 60% by weight reinforcing agent based upon the total weight of the reinforced copolyester molding resin composition.

15. The reinforced flame retardant copolyester molding resin composition of claim 14 wherein said reinforcing agent is glass fibers.

16. The reinforced flame retardant copolyester molding resin composition of claim 14 wherein said reinforcing agent is acicular calcium metasilicate.

17. The reinforced flame retardant copolyester molding resin composition of claim 15 wherein said copolyester comprises (a) 1,4-butane diol, (b) dimethyl terephthalate, and (c) 2,2-bis[3,5-dibromo-4-(2-hydroxyethoxy) phenyl] propane.

18. The reinforced flame retardant copolyester molding resin composition of claim 13 wherein said polycarbodiimide is selected from the group consisting of poly (tolyl carbodiimide), poly (4,4'-diphenylmethane carbodiimide), poly (3,3'-dimethyl-4,4'-biphenylene carbodiimide), poly (p-phenylene carbodiimide), poly(m-phenylene carbodiimide), poly (3,3'-dimethyl-4,4'-diphenylmethane carbodiimide), and mixtures thereof.

19. The reinforced flame retardant copolyester molding resin composition of claim 18 wherein said reinforced flame retardant copolyester composition comprises from about 15 to about 60% by weight reinforcing agent, from about 0.7 to about 10% by weight Group Vb metal-containing compound, from about 30 to about 80% by weight copolyester, and from about .25 to about 5% by weight polycarbodiimide based upon the total weight of the reinforced flame retardant copolyester molding resin composition.

20. A reinforced flame retardant copolyester molding resin composition consisting of from about 20 to about 50% by weight of at least one reinforcing agent, from about 2 to about 7% by weight of at least one Group Vb metal-containing compound intimately admixed with the reaction product of A. from about 40 to about 75% by weight of a copolyester comprising
1. at least one alkane diol having 3 or 4 carbon atoms selected from the group consisting of 1,3-propane diol and 1,4-butane diol,
2. terephthalic acid, isophthalic acid, or a dialkyl ester thereof wherein the alkyl radical contains from one to seven carbon atoms, and
3. a halogenated derivative of bishydroxyethylether of p,p'-isopropylidenediphenol, having the structural formula

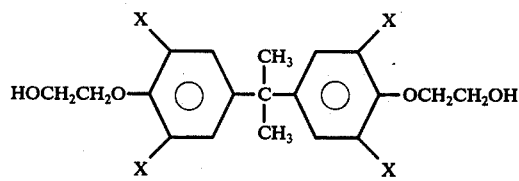

wherein the X's represent bromine and/or chlorine atoms and the halogenated derivative of the bishydroxyethylether of p,p'-isopropylidenediphenol comprises from about 10 to about 30% by weight of the copolyester composition, and B. from about .35 to about 4% by weight of a polycarbodiimide selected from the group consisting of poly (tolyl carbodiimide) poly (4,4'-diphenylmethane carbodiimide), and mixtures thereof.

21. The reinforced flame retardant copolyester molding resin composition of claim 20 wherein said reinforcing agent is glass, said Group Vb metal-containing compound is $Sb_2O_3$, said copolyester comprises the reaction product (a) 1,4-butane diol (b) dimethyl terephthalate, and (c) 2,2-bis[3,5, dibromo-4-(2-hydroxyethoxy)-phenyl]propane, and said polycarbodiimide is poly (4,4'-diphenylmethane carbodiimide).

* * * * *